United States Patent [19]
Sangwan

[11] Patent Number: 5,836,083
[45] Date of Patent: Nov. 17, 1998

[54] REMOTE ELASTIC CENTER MACHINE

[76] Inventor: Joo Sangwan, Shochiku-so 1F Room 5 8-36, Ishibashi 4-chome, Ikeda-shi, Osaka 563, Japan

[21] Appl. No.: 633,784
[22] PCT Filed: Aug. 18, 1995
[86] PCT No.: PCT/JP95/01638
  § 371 Date: Apr. 18, 1996
  § 102(e) Date: Apr. 18, 1996
[87] PCT Pub. No.: WO96/05947
  PCT Pub. Date: Feb. 29, 1996

[30]     Foreign Application Priority Data

Aug. 19, 1994 [KR] Rep. of Korea .................. 1994 20470

[51] Int. Cl.$^6$ ...................................................... G01B 5/25
[52] U.S. Cl. .................................. 33/644; 33/520; 901/45
[58] Field of Search ............................ 33/644, 520, 572; 29/406, 407.04; 901/45; 414/730

[56]         References Cited

U.S. PATENT DOCUMENTS

| 4,098,001 | 7/1978 | Watson ........................................ 33/644 |
| 4,367,591 | 1/1983 | Hirabayashi et al. ..................... 33/644 |
| 4,477,975 | 10/1984 | De Fazio et al. ......................... 33/644 |
| 4,537,557 | 8/1985 | Whitney ..................................... 901/45 |
| 5,116,190 | 5/1992 | Silke ........................................... 901/45 |
| 5,396,714 | 3/1995 | Sturges, Jr. et al. ...................... 33/644 |

FOREIGN PATENT DOCUMENTS

| 59-156697 | 9/1984 | Japan . |
| 06-3529 | 1/1994 | Japan . |
| 1537532 | 1/1990 | U.S.S.R. ................................... 901/45 |

*Primary Examiner*—Diego F. F. Gutierrez
*Assistant Examiner*—Andrew Hirshfeld
*Attorney, Agent, or Firm*—Morrison Law Firm

[57]             ABSTRACT

At least either of the upper and lower portions of each of a plurality of elastic bodies (30) provided between an upper structure (10) and a lower structure (20) is movable radially, simultaneously by the same distance in the longitudinal direction of the elastic bodies manually or by a driving means to change the position of an elastic center X, which exists in the axial direction of the machine body, and change the elastic force between the upper and lower structures (10, 20). Either of connections of each of the elastic bodies (30) to the upper and lower structures (10, 20) is a hinge joint or a spherical pair joint, and that of the other is a fixed joint. Alternatively, the upper and lower structures (10, 20) are joined to each other by a plurality of elastic bodies (30), and the connections between the structures and the elastic bodies are hinge joints or spherical pair joints, and at least either of the connections of each body is provided with a fixing means for restraining the degree of freedom of rotation thereof.

10 Claims, 16 Drawing Sheets

REMOTE ELASTIC CENTER MACHINE

FIELD OF THE INVENTION

The present invention relates to a remote elastic center machine which is mounted on a robot or an exclusive assembling machine. More particularly it provides means for actively or passively changing the position of the elastic center existing along the central axial direction of the machine body, so that one machine may perform assembling work of fitting parts of various specifications without changing tools or the like.

BACKGROUND OF THE INVENTION

A remote elastic center machine, or a remote compliance center device (hereinafter referred to as an RCC device) performs smooth assembling by appropriately absorbing relative lateral and angular positioning errors of assembly parts when a robot or an exclusive assembly machine assembles precision parts such as cylindrical shafts, pins, and semiconductor chips. The RCC device prevents the robot or the exclusive assembling machine from excessive load so as to eliminate damage of parts to the maximum extent during assembling. As a result, the RCC device enhances the quality and productivity of products.

The RCC device has a special point known as a compliance center at a specific distance in the central axial direction of a main body from the origin of the coordinate frame provided in the main body. The location of this point depends on the physical properties, focal angle, and mounting radius (a radial distance from the center) of elastic elements which connect an upper structure and a lower structure of the main body.

The conventional RCC device had a simple structure in which a compliance center is fixed at one point. Therefore, when parts of various specifications are assembled, multiple RCC devices must be used in order that the specifications of parts and RCC devices corresponded one by one.

FIGS. 1 to 4 briefly illustrate a conventional RCC device. In the device, a plurality of elastic elements 30 (provided radially at specified angle intervals) are fixed between an upper structure 10 and a lower structure 20. The upper structure 10 is fixed to a robot or an exclusive assembling machine 40. On the lower side of the lower structure 20, a gripper 50 is provided so as to grip a part A to be assembled.

FIG. 1 shows a state in which the focus F where extension lines of the central axes of the slant elastic elements 30 intersect is set in a long distance from the upper structure 10. FIG. 2 shows a state in which the focus F is set in a short distance therefrom. In other words, the focal angle θ of the elastic element 30 in FIG. 1 is large, while that in FIG. 2 is smaller. In such cases, generally, the compliance center X is present on the central axial line between the upper structure 10 and the focus F. Such a position is determined by the modulus of elasticity, focal angle θ and mounting radius r of the elastic element 30.

The compliance center X of the RCC device is a special position at which a horizontal external force passing this position gives an assembly part a translation (horizontal) motion, and a pure moment about this position provides the assembly part with only a rotary motion around the position.

When the compliance center X of the RCC device exists in the front end portion of the part held by the gripper 50, if there is a relative position error between assembly parts as shown in FIG. 3, the horizontal component of the reaction R by contact of the front end portion of the part on the gripper 50 with the other part passes near the compliance center X, and therefore the part is moved horizontally as shown in FIG. 4, and resulting in smooth assembling. The RCC device is a device for applying such a compliance center X in the assembling work of precision parts.

On the other hand, in the RCC device, the position of the focus F changes depending on the focal angle θ of the elastic element 30, and accordingly the position of the compliance center X changes, and hence parts to be assembled vary in specification depending on the center position S. What is shown in FIG. 1 is suitable for assembling long assembly parts because the compliance center X is located far from the upper structure 10, whereas what is shown in FIG. 2 is suitable for assembling short parts. That is to say, it is utmost preferable that the position of the compliance center X coincides with the front end of an assembly part. When the position of the compliance center X and the front end of the assembly part do not coincide, the part may be inserted obliquely into its mating assembly part, or automatic assembling may be disabled.

FIGS. 5 and 6 show states wherein a cylindrical part A is being inserted into a hole of a mating part. FIG. 5 illustrates a state wherein a cylindrical part which extends over the compliance center X is obliquely inserted into a hole of a mating part. FIG. 6 illustrates a state wherein a cylindrical part, which is short and does not reach the compliance center X, is also obliquely inserted in the same manner as in FIG. 5.

In the conventional RCC device, as stated above, since the focal angle θ of an elastic element 30 is fixed, the position of the compliance center X is also fixed at one point, and, consequently, the standard of corresponding parts is naturally limited. As a result, in order to handle a variety of parts, it is necessary to prepare RCC devices of various specifications corresponding to individual standards. That is, in the conventional RCC device, since the position of the compliance center X is fixed, if types and standards of parts to be assembled are diversified, specific RCC devices must be prepared according to the standards of parts, which entails changing tools during assembling job. As a result, it takes time to perform assembling and expensive peripheral devices such as tool changers are required. That is to say, the conventional RCC device fails to enhance competitiveness in productivity, quality, production cost and the like.

It is hence an object of the present invention to provide means for changing a position of a compliance center X on an axial direction of a device body and simultaneously changing an elasticity (stiffness) between an upper structure 10 and a lower structure 20, by designing a plurality of elastic elements 30 provided between the upper and lower structures 10 and 20 to move radially, simultaneously by the same distance so as to change a focal angle θ and a mounting radius r of the elastic elements 30.

It is another object of the present invention to provide means for reducing an elasticity (stiffness) between the upper and lower structures 10, 20, without changing an elasticity of the elastic elements 30 per se, and smoothing the relative displacement between the upper and lower structures 10, 20.

SUMMARY OF THE INVENTION

A compliance center device of the present invention includes in its construction an upper structure 10, a lower structure 20 and a plurality of elastic elements 30 disposed between the structures 10 and 20. At least either the upper portions or the lower portions of a plurality of elastic elements 30 are movable radially, simultaneously by the same distance in radial directions manually or by driving means to change the position of a compliance center X, which exists in the central axial direction of the device body, and change the stiffness between the upper and lower structures 10, 20. This constitution allows to freely change the position of the compliance center X and the stiffness of the RCC device at the compliance center X, and contributes to prevention of machine trouble during change of RCC devices and enhancement of productivity following shorter working hours.

The upper and lower structures 10, 20 are joined to each other by a plurality of elastic elements 30, and either or both of the connections of each of elastic elements 30 to the upper and lower structures 10, 20 are hinge joints or spherical pair joints. In case both of the connections of the above are hinge or spherical pair joints, a fixing means is provided for restraining the degree of freedom of rotation of one side of the connections. In this constitution, the stiffness between the upper and lower structures 10, 20 is smaller than that in the constitution with fixed joints on both the connections.

BEST MODES OF THE INVENTION

Figure 1:
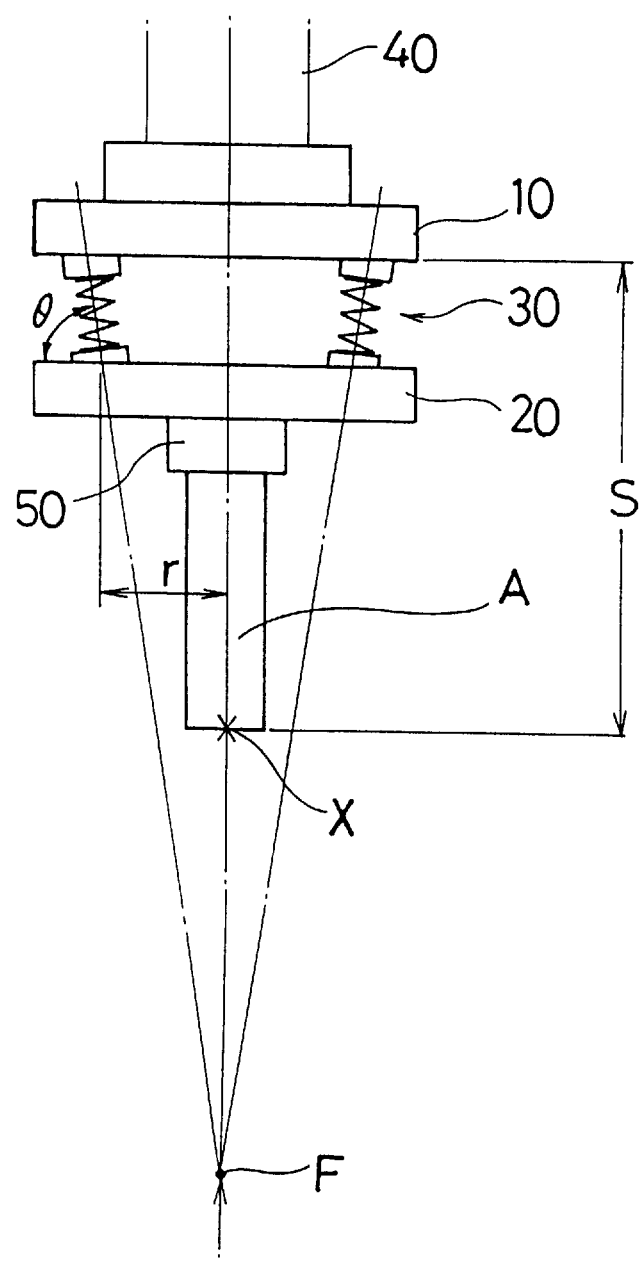
FIG. 1 is a structural diagram of a conventional RCC device, showing the position of the compliance center in case of a large focal angle of an elastic element.
Figure 2:
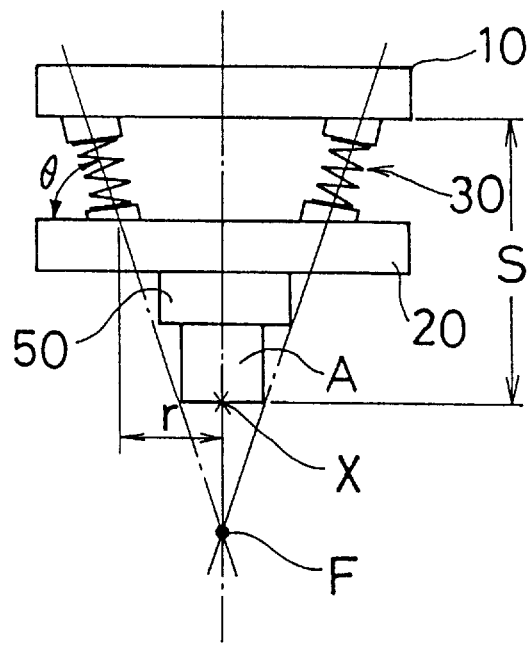
FIG. 2 is a structural diagram of a conventional RCC device, showing the position of the compliance center in case of a small focal angle of an elastic element.
Figure 3:
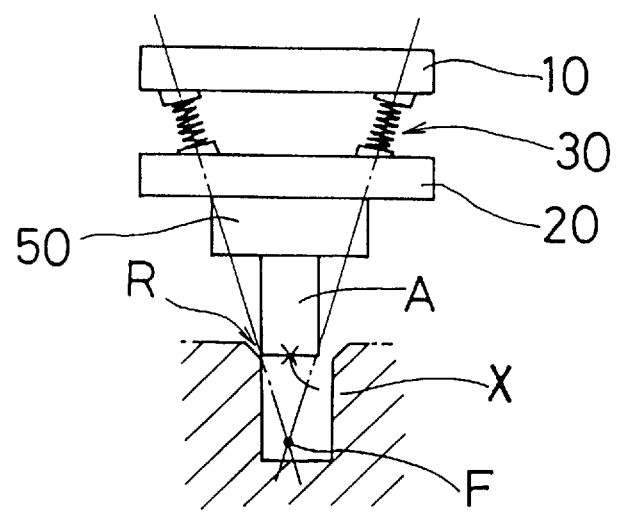
FIGS. 3 and 4 are diagrams showing smooth insertion of an assembly part into a mating part wherein the assembly part has a compliance center at the front end thereof and a position error with regard to the mating part.
Figure 4:
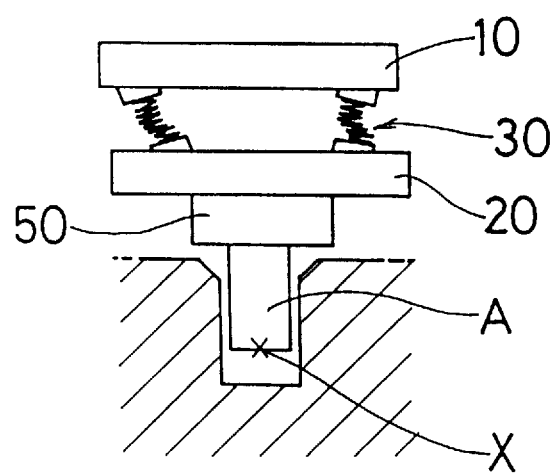
Figure 5:
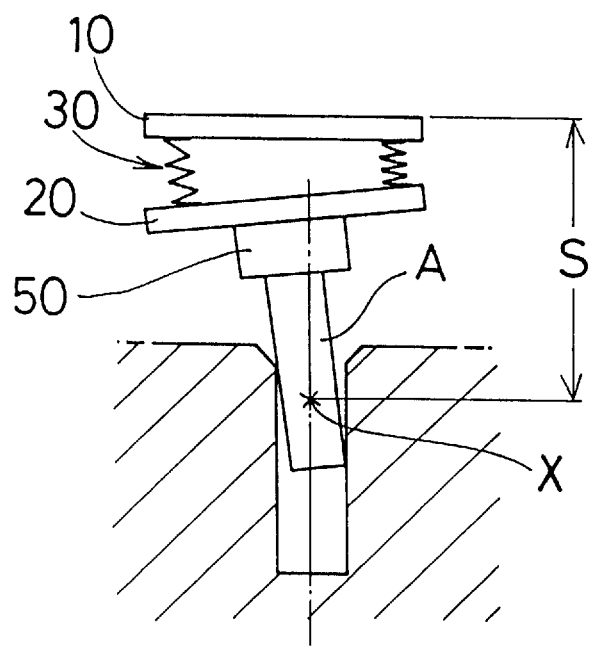
FIG. 5 is a diagram showing a forcible assembly state wherein a compliance center is not present at the front end of an assembly part and the assembly part is long and extends over the compliance center of the RCC device.
Figure 6:
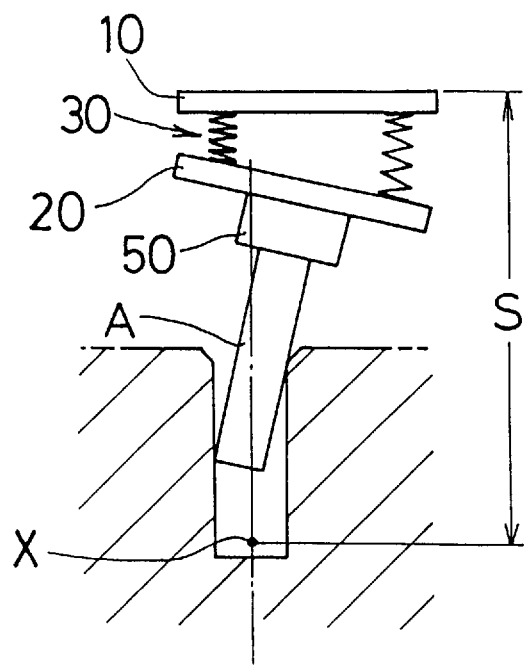
FIG. 6 is a diagram showing a forcible assembly state wherein a compliance center is not present at the front end of an assembly part, and the assembly part is short and does not reach the compliance center.
Figure 7:
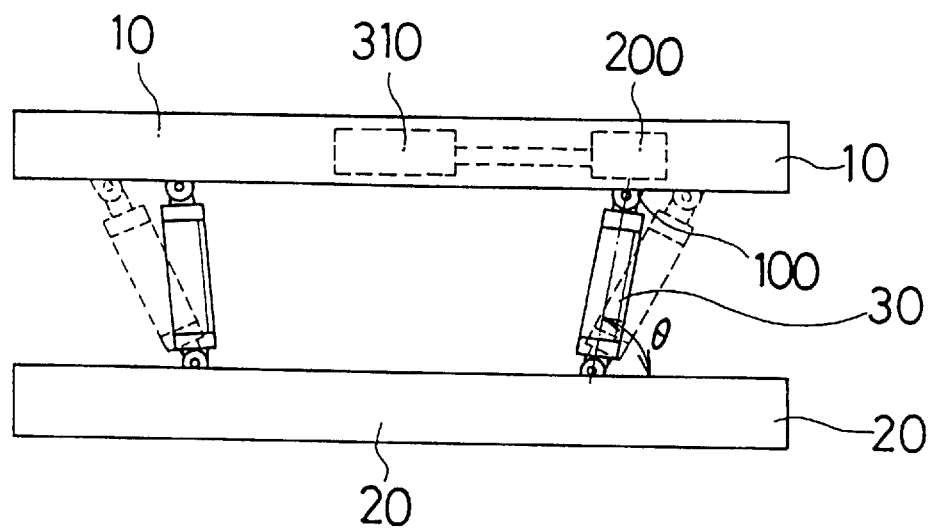
FIG. 7 is a side view of a device having driving means disposed in an upper structure.
Figure 8:
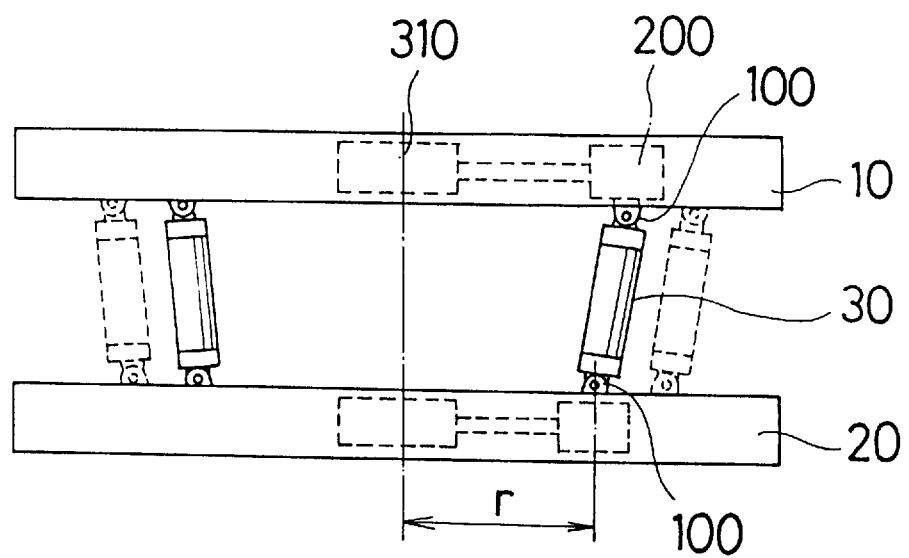
FIG. 8 is a side view of a device having driving means disposed in both an upper and a lower structure.

FIGS. 7 and 8 are side views of variable type RCC devices of the present invention. In FIG. 7, a driving means 310 is provided in an upper structure 10, while in FIG. 8, driving means 310 are provided in an upper structure 10 and in a lower structure 20 respectively.

An elastic element 30 is provided with connectable hinges 100 at an upper portion and a lower portion. In FIG. 7, each of upper hinges 100 is coupled to a slider 200. Upper ends of elastic elements 30 are radially, simultaneously moved by the same distance by the driving means 310 provided in the center of the structure to change a focal angle θ of each of the elastic elements 30. When the angle is adjusted, each of hinges at lower portions of elastic elements is immobilized in rotation, and each of hinges at upper portions thereof is fixed on occasion. In FIG. 8, on the other hand, driving means are provided in both the upper and lower structures 10, 20, and a mounting radius r of an elastic element 30 is also set variable. Therefore, stiffness between the upper and lower structures 10, 20 and the position of the compliance center X can be substantially changed. Consequently, free adjustments can be made depending on standards of assembly parts. The device in FIG. 8, alternatively, may be designed to change only the mounting radius r with no change in a focal angle θ.

Figure 9:
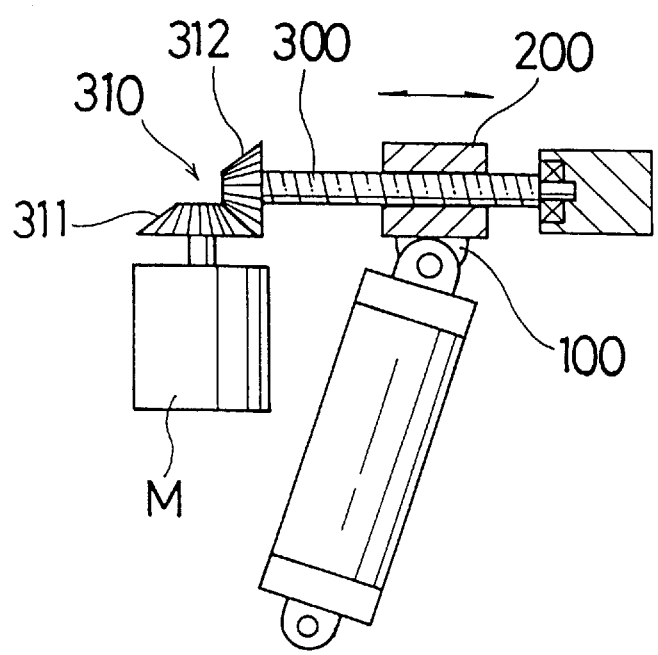
FIG. 9 is a side view of driving means of the present invention.
Figure 10:
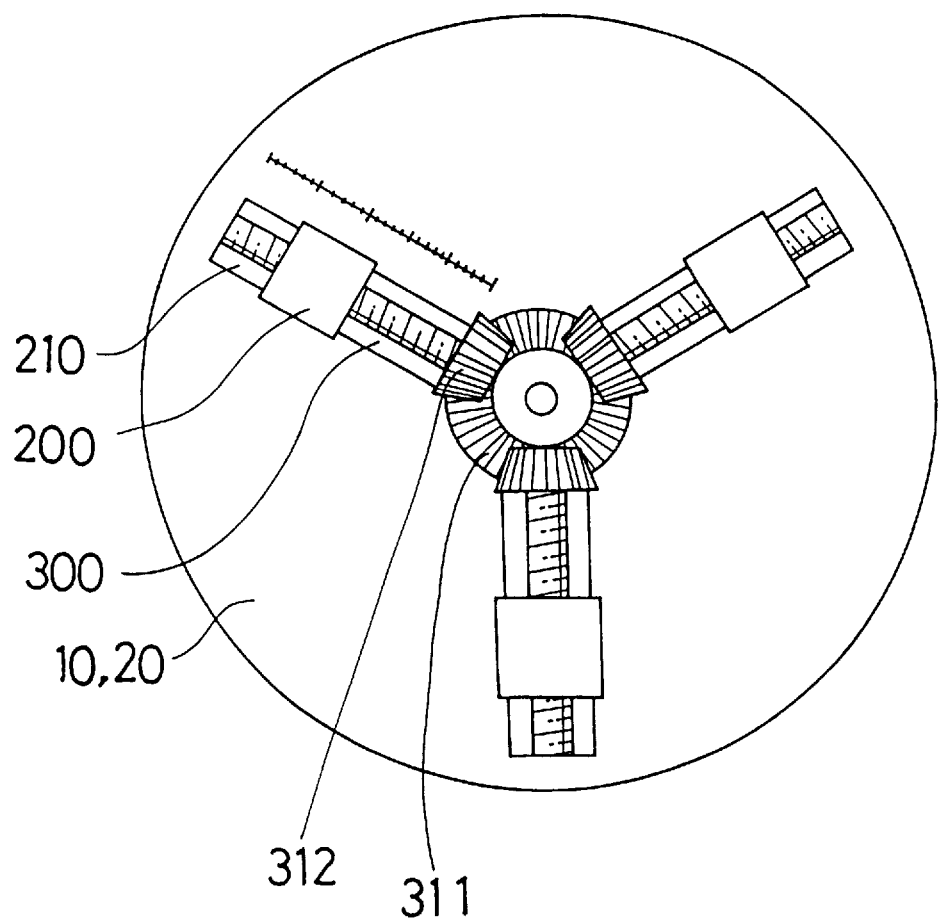
FIG. 10 is a plan view of driving means of the present invention.

FIGS. 9 and 10 illustrate the driving means 310 more specifically. A hinge 100 is coupled to a slider 200. The slider 200 is screwed in by one of three bolt shafts 300 disposed radially in the center of the structure. The bolt shafts 300 are designed to be rotated simultaneously by the same angle by a driving bevel gear 311 located in the center of the upper structure 10 through respective driven bevel gears 312.

The driving bevel gear 311 is designed to be rotated by an actuator such as a motor M or manually to transmit a specific rotational angle uniformly to the respective bolt shafts 300. The sliders 200 are connected to slide grooves 210 provided inside the structure so as to be moved horizontally following the rotation of the bolt shafts 300.

In such a driving mechanism, the rotation of the driving bevel gear 311 causes the driven bevel gears 312 to be rotated, and simultaneously the bolt shafts 300 fixed to the driven bevel gears 312 to be rotated. Consequently, the sliders 200 fixedly screwed in by the bolt shafts 300 change the focal angle θ of the elastic elements 30. The change of the focal angle θ, then, changes the position of the compliance center X and the stiffness of the RCC device.

In this embodiment, three elastic elements 30 are radially provided at intervals of 120 degrees. The present invention, however, is not limited thereto and mounting intervals and the number of elastic elements to be mounted may be selectable according to the design specification of a designer. For example, four elastic elements 30 may be arranged at intervals of 90 degrees, or driving means may be mounted in either of the upper and lower structures 10, 20.

Moreover, a scale may be provided along the slide groove 210 in the upper structure 10 or the lower structure 20 so as to easily see the moving distance of the slider 200, or a proper angle gauge may be provided in the center part of the structure so as to measure the rotational angle of the driving bevel gear 311.

Figure 11:
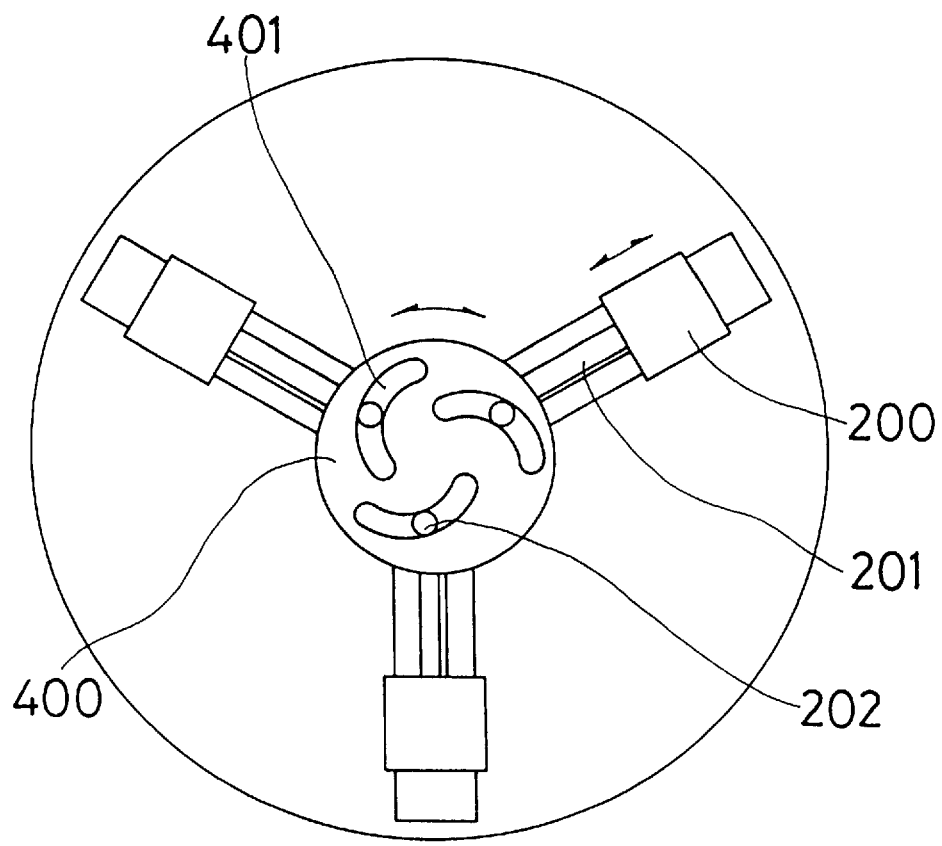
FIGS. 11 and 12 are plan views of other driving means of the present invention.
Figure 12:
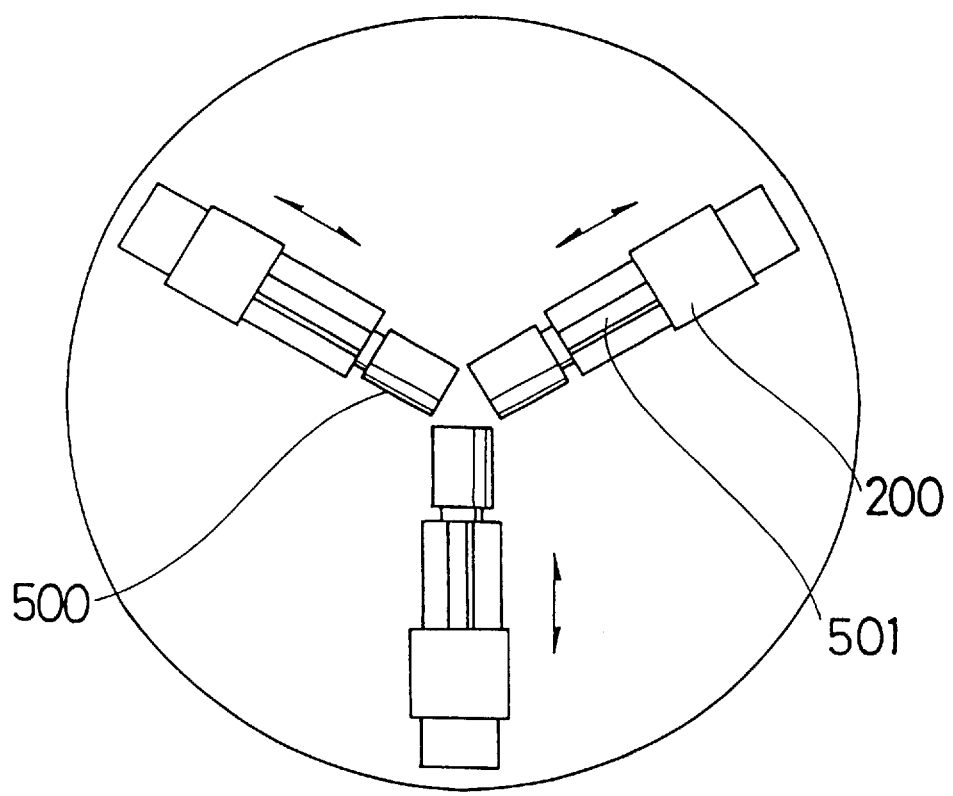

FIGS. 11 and 12 show other types of driving means of the present invention. In FIG. 11, an end portion 202 of a lever 201 coupling to a slider 200 engages with a guide groove 401 of a cam 400. Three sliders 200 fixed to the respective levers 201 simultaneously move by the same distance following the rotation of the cam 400. The driving means in FIG. 12 is constructed with three sliders 200 coupled to respective pistons 501 of hydraulic or pneumatic cylinders 500. The three sliders 200 simultaneously move by the same distance by simultaneous actions of the pistons. Any other driving means in which sliders are moved simultaneously by the same distance should be regarded within the technical scope of the invention.

As stated above, in the present invention, the focal angle θ and the mounting radius r of the elastic elements which join the upper and lower structures 10, 20 of the RCC device can be changed. Therefore by freely changing the position of compliance center and the stiffness, parts of various standards can be assembled by a single RCC device, without changing RCC devices. Consequently, machine trouble during change of RCC devices is prevented and productivity is enhanced by shortening working hours.

Figure 13:
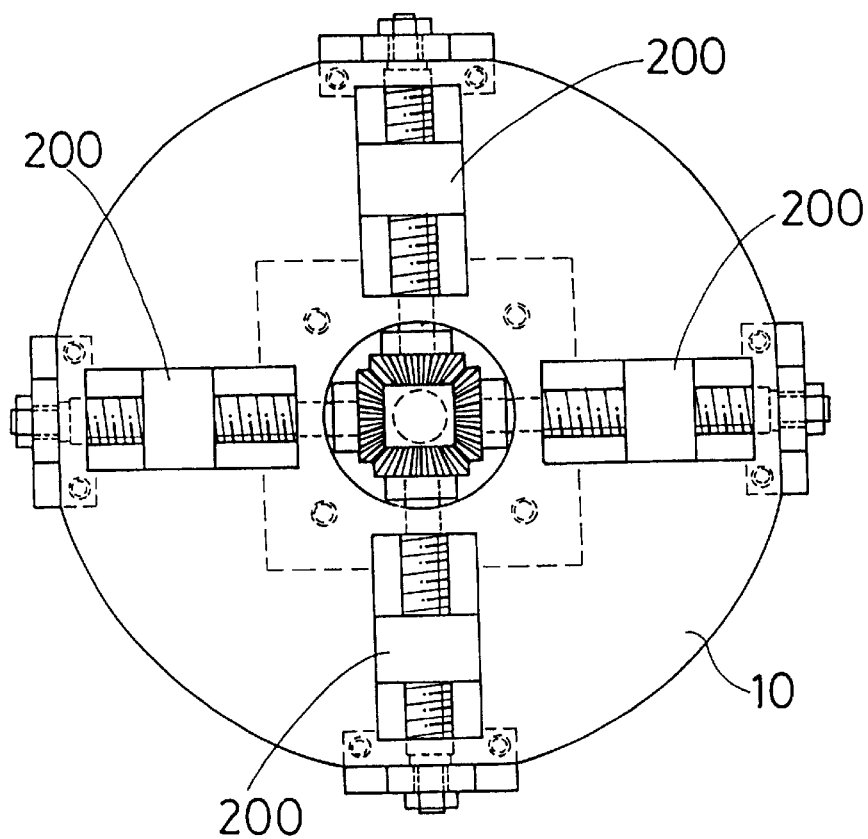
FIG. 13 is a top view showing an example of spherical pair connections between elastic elements and the upper structure.
Figure 14:
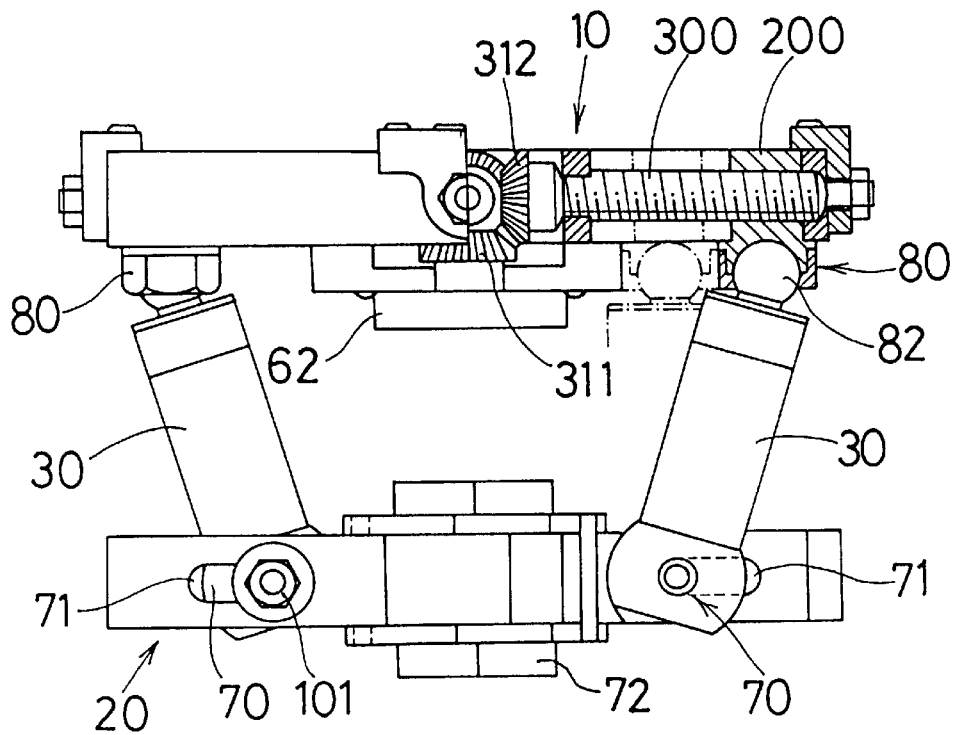
FIG. 14 is a side view showing the example of a spherical pair connection between an elastic element and the upper structure.
Figure 15:
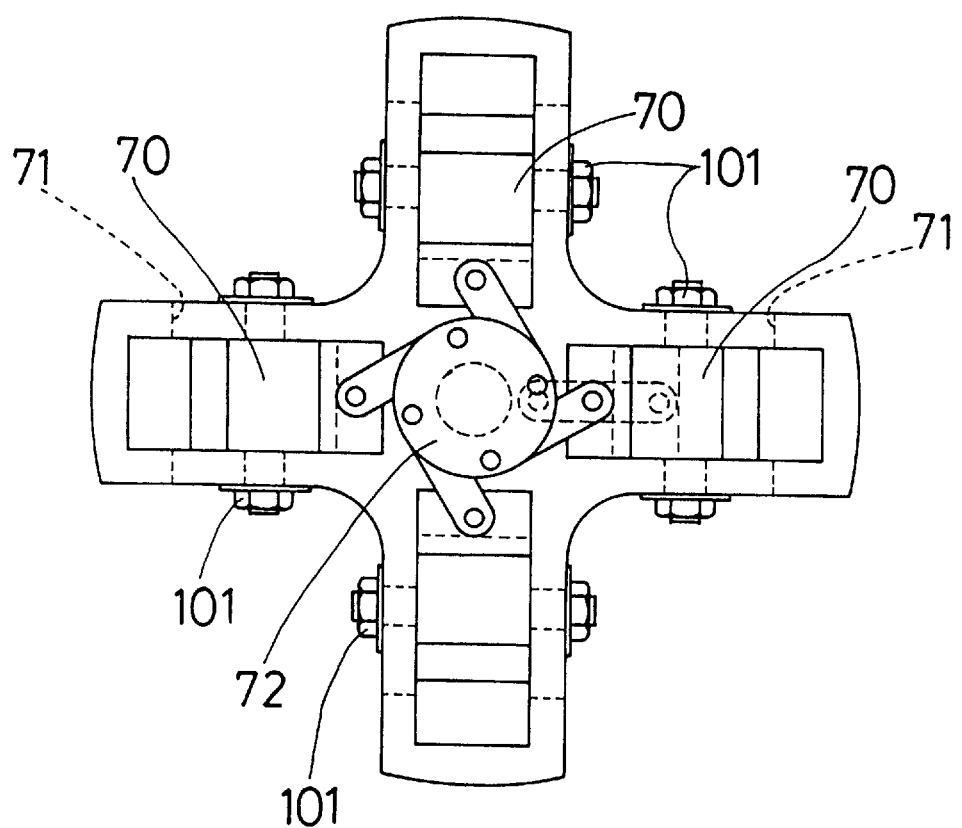
FIG. 15 is a bottom view showing the example of spherical pair connections between the elastic elements and the upper structure.

In the foregoing embodiments, the connection between each of the elastic elements and the upper and lower structures 10, 20 is a hinge joint. Alternatively, the connection may be obtained by a spherical contraposition connection as shown in FIGS. 13 to 15.

In the embodiment in the drawings, sliders 200 moving in cooperation with the rotation of a knob 62 are adjusted to settle at specific radial positions. After that, the freedom of rotation of ball joints 82 between the sliders 200 and the elastic elements 30 is restrained by nut journals 80 shown in FIG. 14.

The nut journal 80 is coupled by thread with the slider 200. Tightening the nut journal 80 may restrain the freedom of rotation of the ball joint 82 at one end of the elastic element 30. On the other hand, loosening it allows to give freedom of rotation to the ball joint.

The connection between the lower structure 20 and the elastic element 30 is a hinge joint 70. When a knob 72 is rotated in a loose state of nuts 101 as shown in FIG. 15, lower portions of the elastic elements 30 are simultaneously moved by the same distance within a range of length of slots 71.

In the embodiment in FIGS. 13 to 15, one end of each of the elastic elements 30 is connected by a spherical pair joint, and the other end by a hinge joint, but this arrangement may be reverse to what is shown in the drawings. Furthermore, both of the ends may be connected by spherical pair joints.

Figure 16:
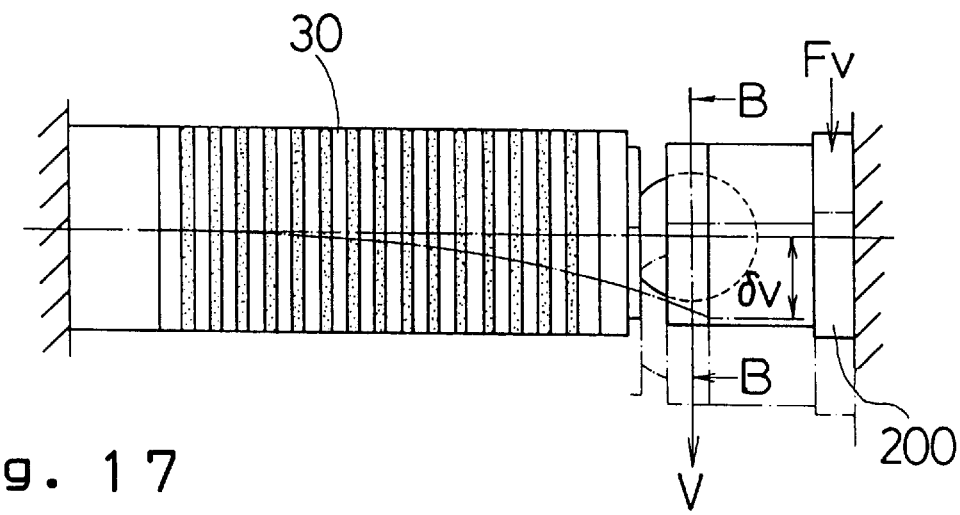
FIG. 16 is a magnified view showing an elastic element, one end of which is fixed and the other end of which is provided with a pin hinge.
Figure 17:
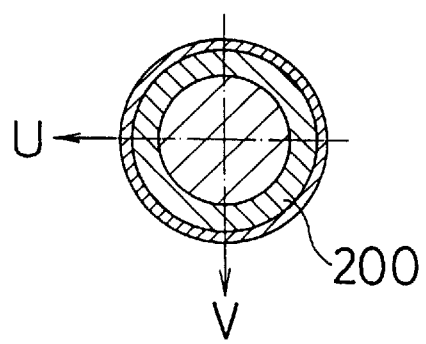
FIG. 17 is a sectional view taken on line A—A of FIG. 16.
Figure 18:
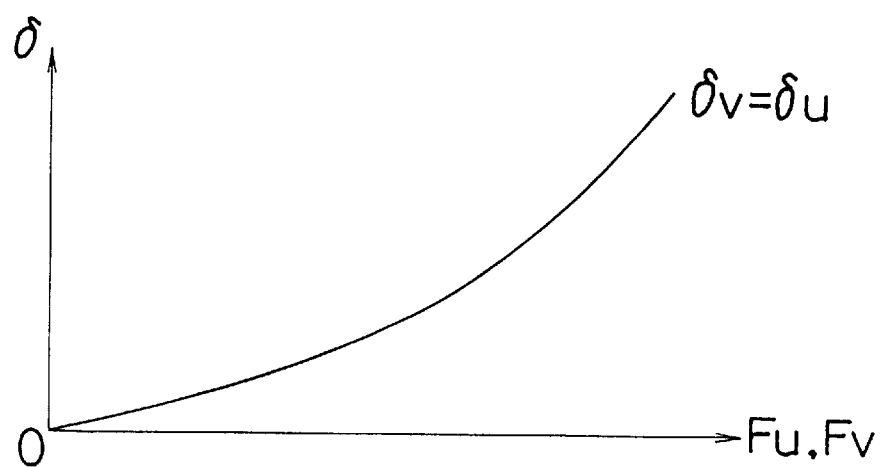
FIG. 18 is a graph showing displacement of the front end hinge portion of the elastic body due to external force corresponding to the moving direction of a slider.

When one end of each of the elastic elements 30 is fixed and the other end thereof is coupled by a hinge, as shown in FIG. 16, supposing the rotation center direction of the hinge is u and the perpendicular direction thereto is v, displacements δv, δu of the front end hinge of the elastic element 30 by external forces Fu, Fv corresponding to the moving direction of the slider 200 are different as shown in FIG. 18. Therefore, a directivity occurs in the remote compliance center position and the stiffness of the RCC device.

Figure 19:
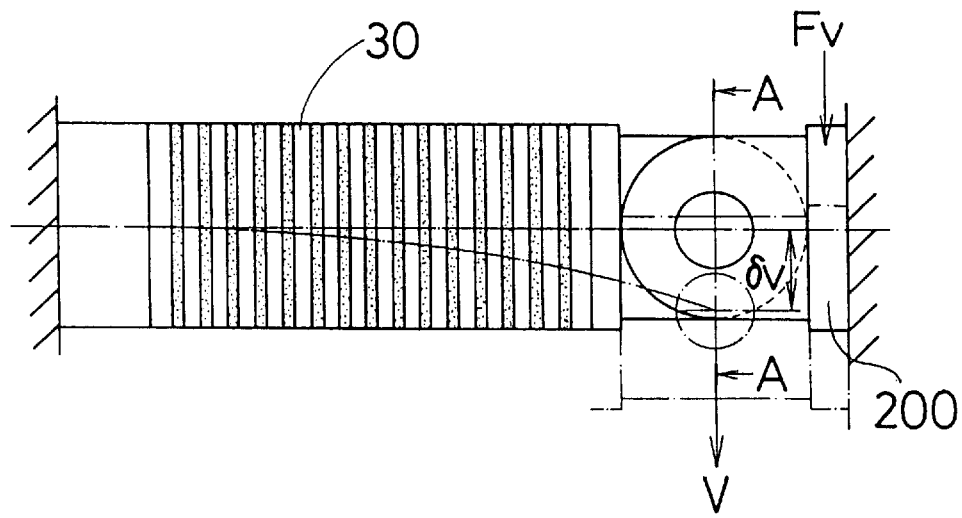
FIG. 19 is a magnified view of an elastic element, one end of which is fixed and the other end of which is provided with a spherical pair joint.
Figure 20:
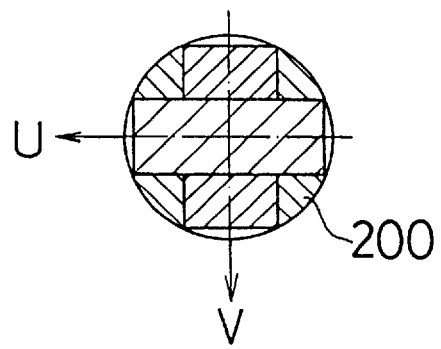
FIG. 20 is a sectional view taken on line B—B of FIG. 19.
Figure 21:
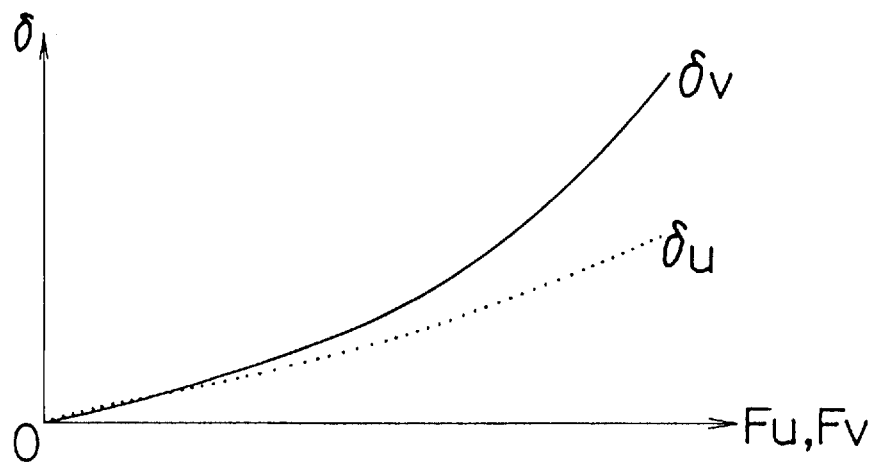
FIG. 21 is a graph showing displacement of the front end spherical pair joint of the elastic element due to external force corresponding to the moving direction of a slider.

On the other hand, as shown in FIG. 19, when one end of each of the elastic elements 30 is fixed and the other end thereof is connected by a spherical pair joint, displacements δv, δu of the front end connecting portion of the elastic element corresponding to the displacement direction of the slider 200 can suppress occurrence of directivity to the maximum extent as shown in FIG. 21.

Therefore, with a hinge joint or a spherical pair joint, the stiffness between the upper and lower structures 10, 20 can be reduced without changing the elasticity of the elastic elements 30. And the distance to the compliance center can be extended, and it is particularly practical in the latter connection.

The elastic elements 30 may be made of rubber material only, or formed by laminating an elastic plate and a rubber plate.

What is claimed is:

1. A remote compliance center device comprising: an upper structure; a lower structure; a plurality of elastic elements disposed between said upper and lower structures; at least one of upper and lower portions of said respective elastic elements are moveable radially, simultaneously by substantially the same distance in radial directions by mechanical means in at least one of said upper and lower structures to change a position of a compliance center which exists in a central axial direction of said remote compliance center device and to change a stiffness between said upper and lower structures; said mechanical means is a driving which includes: a driving bevel gear which rotates at the center of the remote compliance center device; a plurality of driven bevel gears which are interlocked with said driving bevel gear, each of said driven bevel gears coupled with a corresponding bolt shaft which is screwed into a corresponding slider; and where said plurality of sliders are each pivotably connected to a respective elastic element.

2. A remote compliance center device comprising an upper structure; a lower structure; a plurality of elastic elements which join said upper and lower structures at a plurality of connections, said connections between said upper and lower structures and said elastic elements are one of hinge joints and spherical pair joints; and at least one of said connections of each of said elastic elements to said upper structure and said lower structure is provided with a fixing means for retraining the degree of freedom of rotation thereof.

3. A remote compliance center device according to claim 2 wherein said connections are supported by a plurality of sliders; said sliders move on at least on of said upper and lower structures.

4. A remote compliance center device comprising an upper structure; a lower structure; a plurality of elastic elements disposed between said upper and lower structures; said elastic elements being movable radially, simultaneously, by substantially the same distance, in parallel, by mechanical means in at least one of said upper and lower structures to change a position of a compliance center in a central axial directional of said remote compliance center device; said mechanical means is a driving means which includes a driving bevel gear which rotates at the center of the remote compliance center device; a plurality of driven bevel gears which are interlocked with said driving bevel gear, each of said driven bevel gears is coupled with a corresponding bolt shaft which is screwed into a corresponding slider; and said plurality of sliders are each pivotably connected to said elastic elements.

5. A remote compliance center device comprising an upper structure, a lower structure, a plurality of elastic elements which join said upper and lower structures at a plurality of connections; said connections are one of hinge joints and spherical pair joints; at least one said connections is provided with a fixing means for retraining the degree of freedom of rotation thereof; said elastic elements each further include an upper and lower portion; at least one of said upper portions and lower portions of said elastic elements is movable radially, simultaneously by substantially the same distance in radial directions by mechanical means to change a position of a compliance center which exists in a central axial direction of said remote compliance center device, and change a stiffness between said upper and lower structures.

6. A remote compliance center device according to claim 5 wherein said connections are supported by a plurality of sliders; said sliders move on at least one of said upper and lower structures.

7. A remote compliance center device comprising an upper structure; a lower structure; a plurality of elastic elements which join said upper and lower structures at a plurality of connections; said connections are one of hinge joints and spherical pair joints; at east one connections is provided with a fixing means for restraining the degree of freedom or rotation thereof; said elastic elements provided between said upper and lower structures are movable radially, simultaneously by substantially the same distance, in parallel, by mechanical means in said upper and lower structures to change a position of a compliance center in a central axial direction of said remote compliance center device.

8. A remote compliance center device according to claim 7 wherein said connections are supported by a plurality of sliders; said sliders move on at least one of said upper and lower structures.

9. A remote compliance center device comprising an upper structure; a lower structure; and a plurality of elastic elements disposed between said upper and lower structures, said elastic elements being supported by a plurality of sliders; said sliders being effective to radially move on at least one of said upper and lower structures; at least one of upper portions and lower portions of said respective elastic elements are movable radially, simultaneously by substantially the same distance in radial directions by mechanical means in at least one of said upper and lower structures to change a position of a compliance center which exists in a central axial direction of said remote compliance center device, thereby changing a stiffness between said upper and lower structures, wherein said mechanical means is a driving means including:

a plurality of levers each having an end portion and each mechanically coupled to its own slider; and a cam having a plurality of guide grooves, each of said guide grooves engaging its own end portion of a respective lever.

10. A remote compliance center device comprising an upper structure; a lower structure; and a plurality of elastic elements disposed between said upper and lower structures, said elastic elements being supported by a plurality of sliders; said sliders being effective to radially move on at least one of said upper and lower structures; at least one of upper portions and lower portions of said respective elastic elements are movable radially, simultaneously by substantially the same distance in radial directions by mechanical means in at least one of said upper and lower structures to change a position of a compliance center which exists in a central axial direction of said remote complaince center device, thereby changing a stiffness between said upper and lower structures, where said mechanical means is a driving means including:

a plurality of cylinders which are one of hydraulic and pneumatic;

said cylinders each having a piston mechanically coupled to a respective slider; and upon an actuation of said mechanical means, said cylinders are all actuated simultaneously.

* * * * *